US012698953B2

(12) United States Patent
Glick

(10) Patent No.: US 12,698,953 B2
(45) Date of Patent: Aug. 4, 2026

(54) IMPACT RESISTANT GARAGE DOOR

(71) Applicant: Amos B. Glick, Gap, PA (US)

(72) Inventor: Amos B. Glick, Gap, PA (US)

( * ) Notice: Subject to any disclaimer, the term of this patent is extended or adjusted under 35 U.S.C. 154(b) by 149 days.

(21) Appl. No.: 18/107,770

(22) Filed: Feb. 9, 2023

(65) Prior Publication Data

US 2024/0200912 A1 Jun. 20, 2024

Related U.S. Application Data

(60) Provisional application No. 63/433,838, filed on Dec. 20, 2022.

(51) Int. Cl.

| | |
|---|---|
| ***E06B 3/70*** | (2006.01) |
| ***E06B 5/12*** | (2006.01) |
| ***F41H 5/013*** | (2006.01) |
| ***F41H 5/04*** | (2006.01) |
| ***F41H 5/22*** | (2006.01) |

(52) U.S. Cl.

CPC ........... *F41H 5/226* (2013.01); *E06B 3/7015* (2013.01); *E06B 5/12* (2013.01); *F41H 5/013* (2013.01); *F41H 5/0464* (2013.01); *E06B 2003/7044* (2013.01); *E06B 2003/7051* (2013.01)

(58) Field of Classification Search

CPC ..... E06B 2003/7044; E06B 2003/7051; E06B 2003/7015; E06B 3/48; E06B 5/10; E06B 5/12; E06B 2003/7023; F41H 5/226; F41H 5/045; F41H 5/013; F41H 5/0464

See application file for complete search history.

(56) References Cited

U.S. PATENT DOCUMENTS

| | | | | |
|---|---|---|---|---|
| 1,899,735 | A | 2/1933 | McClintock | |
| 5,429,340 | A | 7/1995 | Young et al. | |
| 8,001,880 | B2 | 8/2011 | White et al. | |
| 9,200,480 | B2 | 12/2015 | Deiler | |
| 10,012,479 | B2 | 7/2018 | Boviall | |
| 10,281,245 | B2 | 5/2019 | DeKort | |
| 2003/0230036 | A1* | 12/2003 | Lewis, Jr. | E05D 15/0621 52/210 |
| 2006/0230681 | A1* | 10/2006 | Appelman | E06B 7/28 49/49 |
| 2007/0215294 | A1* | 9/2007 | Barrow | E06B 5/003 160/209 |
| 2015/0354926 | A1 | 12/2015 | Gibson | |

(Continued)

*Primary Examiner* — Beth A Aubrey

(74) *Attorney, Agent, or Firm* — Miller Law Group, PLLC

(57) ABSTRACT

A garage door assembly provides resistance to both bullets and impacts while enabling the garage door to move between a horizontal open position and a vertical closed position. The garage door is formed with panels having a front impact shield, a rear plate, and high strength ballistic material sandwiched therebetween. Each panel is formed with a rearwardly extending structure that incorporates lateral extensions of the ballistic material in the panel and forms a hollow portion that encircles a bollard on opposing sides of the garage door. Each panel has a horizontal end cap at the opposing horizontal edges thereof, interconnected by opposing threaded members to encapsulate the sandwich construction of the panels. A cable overlapping the panels can be clamped to horizontal edges of each panel to reinforce the central portion of the garage door. The thickness of the front impact shield varies the resistance characteristics of the door.

19 Claims, 10 Drawing Sheets

(56) References Cited

U.S. PATENT DOCUMENTS

| | | | | |
|---|---|---|---|---|
| 2018/0266172 | A1* | 9/2018 | Wray | E05F 17/004 |
| 2021/0302130 | A1* | 9/2021 | Glick | F41H 5/013 |
| 2021/0317700 | A1* | 10/2021 | Storen | E06B 3/485 |
| 2022/0195787 | A1* | 6/2022 | Kozisek | E06B 3/485 |
| 2023/0184518 | A1* | 6/2023 | Glick | E06B 3/485<br>89/36.01 |

* cited by examiner

Fig. 11
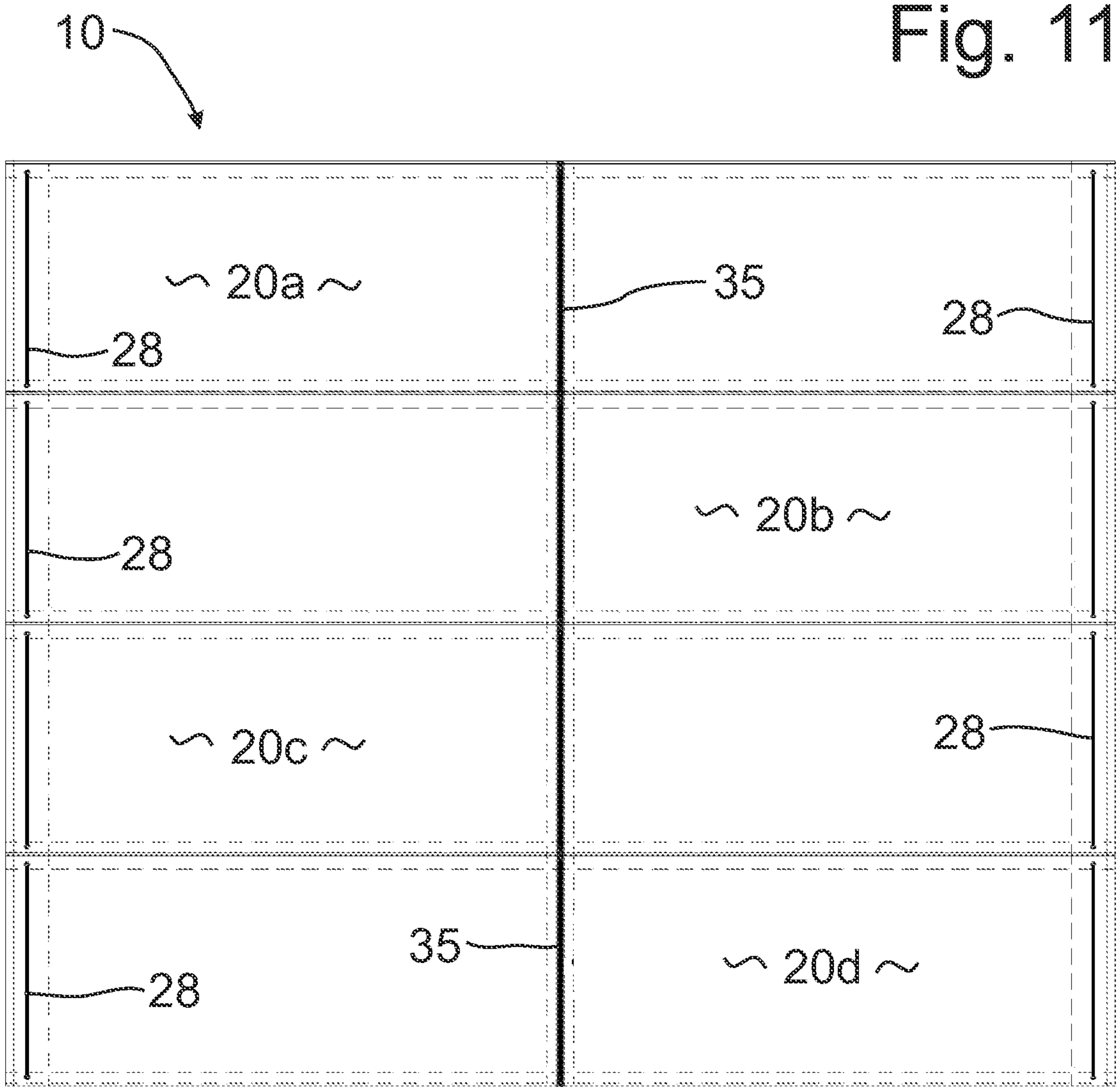
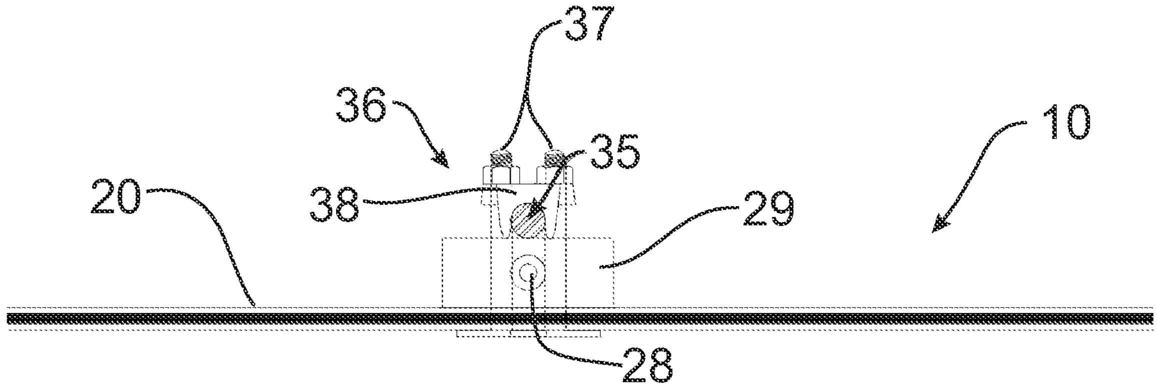
Fig. 13

IMPACT RESISTANT GARAGE DOOR

CROSS-REFERENCE TO RELATED APPLICATIONS

This application claims domestic priority on U.S. Provisional Patent Application Ser. No. 63/433,838, filed on Dec. 20, 2022, the content of which is incorporated herein by reference.

FIELD OF THE INVENTION

This invention relates generally to a garage door providing security for property and occupants behind the garage door and, more particularly, to a garage door configuration that would be resistant to vehicles crashing through the door, as well as other impacts such as from bullets and explosions.

BACKGROUND OF THE INVENTION

Ballistic barriers have been designed and provided to resist and/or prevent the passage of bullets fired at the barrier. Such ballistic barriers have been used at indoor shooting ranges, as security fences for residences and commercial property and other establishments, and as shields for individuals advancing under fire. Ballistic barriers are typically formed of bullet resistant metal and are heavy and difficult to use because of their weight. As security fence structures, the weight of the panels are difficult to install and to maintain.

In U.S. Pat. No. 1,899,735, granted on Jan. 22, 1932, to O. B. McClintock, a security barrier for bank tellers is disclosed in which the barrier is formed from a metal shell supporting bullet resistant glass and a complex structure to provide protection for a bank teller. A modular security fence is disclosed in U.S. Pat. No. 5,429,340, granted on Jul. 4, 1995, to Anthony M. Young, et al, in which the security fence is formed from overlapping panel modules. Each module is formed as an irregularly shaped open shell that interlocks with one or more adjoining modules or shells. Ballistic resistance is a result of opposing outer walls of the open shells when assembled together.

A ballistic barrier is disclosed in U.S. Pat. No. 8,001,880, granted to William C. White, et al., on Aug. 23, 2011, wherein a lower barrier supports attack resistant panes extending upwardly from the barrier. The lower barrier provides protection from vehicle crashes, while the upper attack resistant panes are formed from material, such as plastic, acrylic and polycarbonates, among others, to resist penetration by bullets, particularly rounds fired by handguns. The ballistic wall structures disclosed in U.S. Patent Publication No. 2015/0354926, published on Dec. 10, 2015, by MGM Holdings, LLC, are designed for use in shooting ranges. The intent of this ballistic wall structure is to retain bullets within the wall structure. A ballistic curtain formed of ballistic rubber allows the passage of a bullet, while slowing the speed of the bullet so that the inner plate 54 stops the penetration of the bullet. The rubber curtain also prevents ricochets and fragments from passing back through the curtain.

Another ballistic barrier is disclosed in U.S. Pat. No. 10,012,479, granted to Michael Boviall on Jul. 3, 2018. This ballistic barrier is formed by a wall incorporating louvers or slats angled and overlapping to provide resistance to the passage of bullets by deflecting the path of the bullets downwardly to the ground. IN an alternative embodiment, the angled slats are backed by a backer plate that serves to further deflect the path of the bullets. A ballistic barrier designed to be portable in discrete panels and assembled in a selected location is disclosed in U.S. Pat. No. 10,281,245, granted on May 7, 2019, to Michael J. DeKort. Each panel can be connected to adjoining panels by hinges, and can, thereby, be folded for portability. Each panel is formed with a single pane of solid metal to provide bullet resistance.

Security doors have also been designed to resist bullet penetration, as can be seen in the security door configuration disclosed in U.S. Pat. No. 9,200,480, granted on Dec. 1, 2015 to Alan P. Deiler. In this Deiler patent, the security door is simply formed with an interior core of steel to resist bullet penetration. If a garage door were constructed according to this disclosed configuration, the garage door would have a tendency for bullets to ricochet from the door, rather than to absorb the energy carried by the bullet striking the garage door. The ricocheting bullet can provide a dangerous situation to other people and property near the garage door being struck by the bullet. As one skilled in the art would readily recognize, allowing a bullet to ricochet is not a desirable performance.

Accordingly, it would be desirable to provide an impact resistant garage door structure that can absorb energy from an impacting vehicle, from a nearby explosion or from bullets striking the garage door without allowing the door to be breached, thus protecting the occupants or property behind the garage door.

SUMMARY OF THE INVENTION

It is an object of this invention to overcome the disadvantages of the known prior art devices by providing a garage door apparatus that is both bullet resistant and impact resistant.

It is another object of this invention to provide a door structure that is capable of being raised vertically and be resistant to impacts asserted against the door without yielding.

It is yet another object of this invention to provide a bullet resistant and impact resistant door assembly that can be utilized as a security garage door, or other doors that are moved vertically between open and closed positions.

It is a feature of this invention that the security door is formed with multiple connected panels that are aligned vertically when the security door is moved to a closed position.

It is another feature of this invention that each of the door panels are provided with rearwardly projecting structures that include a hollow section operably arranged to receive a concrete bollard position on opposing sides rearwardly and outwardly of the door assembly.

It is an advantage of this invention that the engagement of the rearwardly projecting structures with the respective bollards provides resistance to the security door yielding along the respective sides of the security door structure.

It is another advantage that the respective door panels are guided in movement between the closed and open positions by rollers engaged with a guide member located forwardly of each respective bollard.

It is still another feature of this invention that the individual door panels are encapsulated from the upper and lower edges of the respective door panels, when viewed in the closed position, by upper and lower cap members.

It is yet another feature of this invention that the upper and lower cap members are interconnected by threaded members spaced along the width of the individual door panels to draw the upper and lower cap members toward one another.

It is still another advantage of this invention that the upper and lower cap members enhance the integrity of the door panels.

It is yet another advantage of this invention that the configuration of the upper and lower cap members provides bullet resistance between adjacent door panels as the adjacent door panels are pivotally moved while being raised and lowered.

It is a further feature of this invention that each door panel is formed as a sandwich assembly with a layer of high strength, lightweight ballistic material located between front impact shield and the rear plate.

It is a further advantage of this invention that the garage door assembly is lightweight while providing impact and bullet resistance.

It is still a further feature of this invention that the ballistic material in each door panel is extended outwardly at the sides of each of the door panels so that the ballistic material is incorporated into the rearwardly projecting structures engaged with the opposing bollards.

It is a further advantage of this invention that the extension of the ballistic material from the ends of the door panel into the respective rearwardly extending structures enhances the strength of the rearwardly extending structures to resist impacts asserted against the door assembly.

It is yet a further feature of this invention that the door structure can incorporate a cable running behind the door panels to interconnect the door panels vertically and enhance the resistance to impacts.

It is still a further advantage of this invention that the location of the cable behind the door panels eliminates the need for expansion of the cable in order to allow the adjacent door panels to rotate relative to one another.

It is another feature of this invention that the cable located behind the door panels are secured to the opposing horizontal edges of each door panel by cable clamps.

It is another advantage of this invention that the utilization of a cable to reinforce the central portion of the door panels enhances the impact resistance of the door.

It is a further object of this invention to provide a garage door apparatus that is resistant to the passage of bullets through the door and resistant to impacts from objects, such as vehicles, striking the exterior of the door.

It is still another feature of this invention that the configuration of the impact resistant garage door provides resistance to impacts such as a motor vehicle ramming the exterior of the garage door, resistance to the passage of bullets through the garage door, forced entry, and explosions.

It is still a further object of this invention to provide a bullet resistant and impact resistant garage door assembly that is durable in construction, carefree of maintenance, easy to assemble, and simple and effective in use.

These and other objects, features and advantages are accomplished according to the instant invention by providing a garage door assembly provides resistance to both bullets and impacts while enabling the garage door to move between a horizontal open position and a vertical closed position. The garage door is formed with panels having a front impact shield, a rear plate, and high strength ballistic material sandwiched therebetween. Each panel is formed with a rearwardly extending structure that incorporates lateral extensions of the ballistic material in the panel and forms a hollow portion that encircles a bollard on opposing sides of the garage door. Each panel has a horizontal end cap at the opposing horizontal edges thereof, interconnected by opposing threaded members to encapsulate the sandwich construction of the panels. A cable overlapping the panels can be clamped to horizontal edges of each panel to reinforce the central portion of the garage door. The thickness of the front impact shield varies the resistance characteristics of the door.

BRIEF DESCRIPTION OF THE DRAWINGS

The advantages of this invention will become apparent upon consideration of the following detailed disclosure of the invention, especially when taken in conjunction with the accompanying drawings wherein:

FIG. 11 is a front elevational view of garage door having an alternative configuration;

FIG. 13 is an enlarged detail view of the mounting of a reinforcement cable to the garage door corresponding to Circle 13 in FIG. 12.

DETAILED DESCRIPTION OF THE PREFERRED EMBODIMENT

Figure 9:
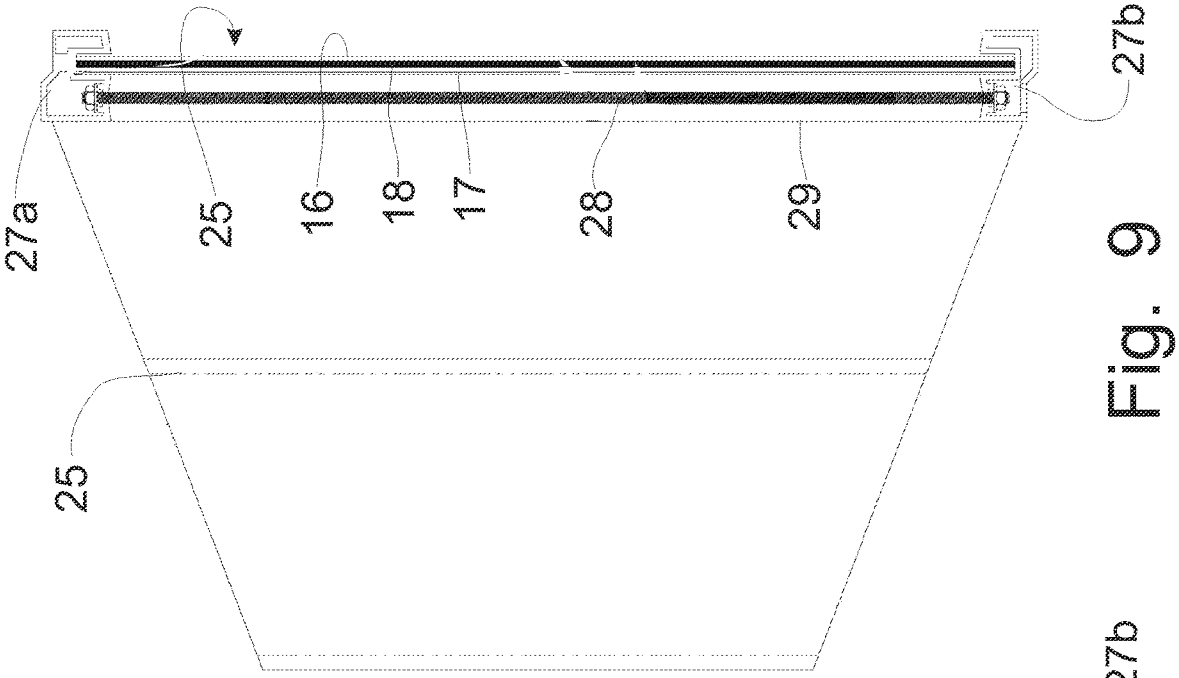
FIG. 9 is a schematic side elevational view of a representative panel that provides a Level 3 impact protection with respect to breach of the impact resistant garage door configuration.
Figure 8:
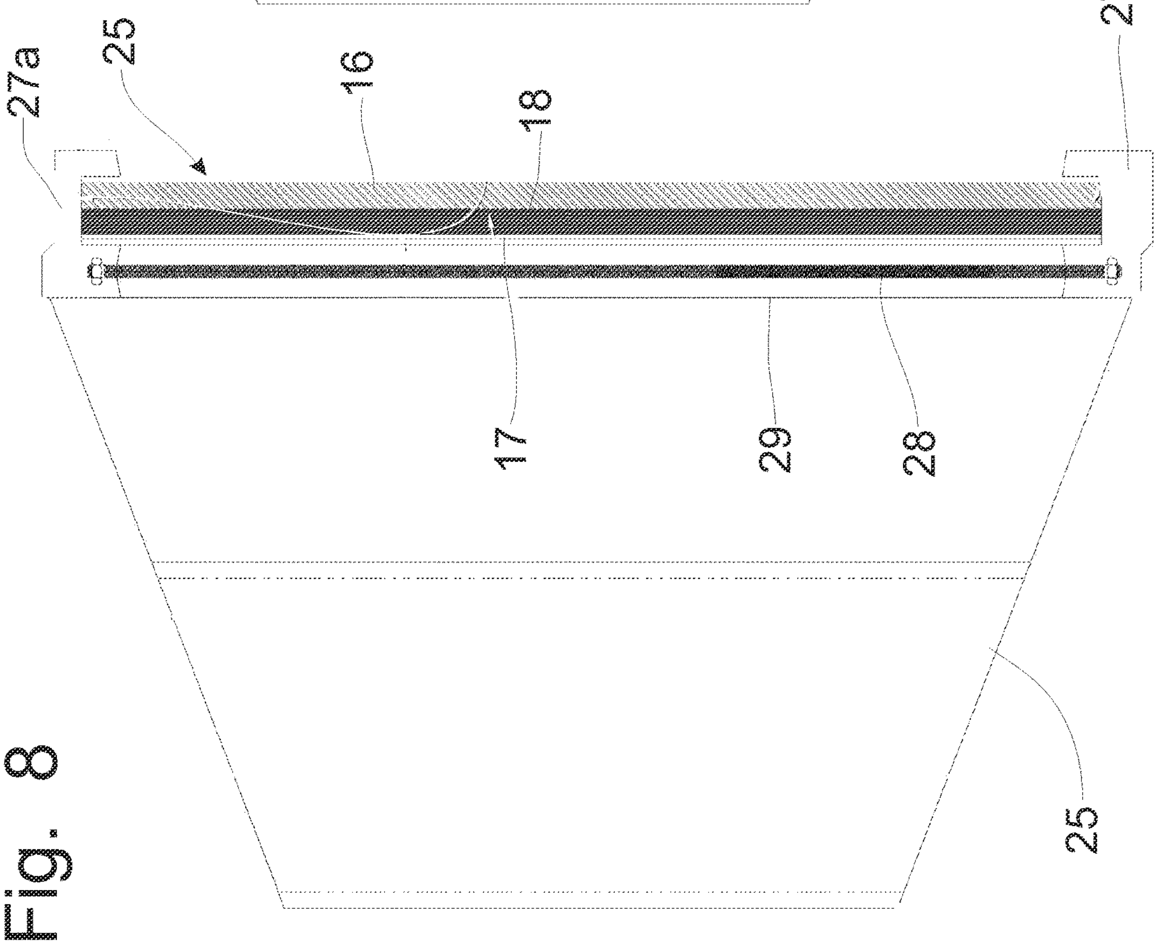
FIG. 8 is a schematic side elevational view of a representative panel that provides a Level 8 impact protection with respect to breach of the impact resistant garage door configuration.

Referring to the drawings, two embodiments of an impact resistant garage door configuration is shown generally, although the differences are depicted in FIGS. 8 and 9 to be described in greater detail below. As both Levels of the impact garage doors are constructed nearly identically, save for the thickness and size of material, the description below is applicable to both Levels of impact resistant garage doors.

An impact resistant garage door 10 incorporating the principles of the instant invention is best seen in FIGS. 1-7. Primarily, the materials used in constructing the impact resistant garage door 10 are a ballistic resistant, high strength, yet lightweight, material, such as Spectra® 7727, manufactured by Honeywell International, Inc., or Ply-Tech Aramid Force Impact H1500, manufactured by Ply-Tech, Inc., and grade 6061 or 6063 aluminum formed as noted below. The primary difference in the Level 8 and Level 3 impact resistant doors 10 is that the number of plies of the bullet resistant material increase from twenty to forty or forty-two and the thickness of the aluminum increases from 0.09 inches to 0.5 inches. Thus, this garage door 10 is resistant to both impacts from vehicles and impacts from bullets.

Figure 1:
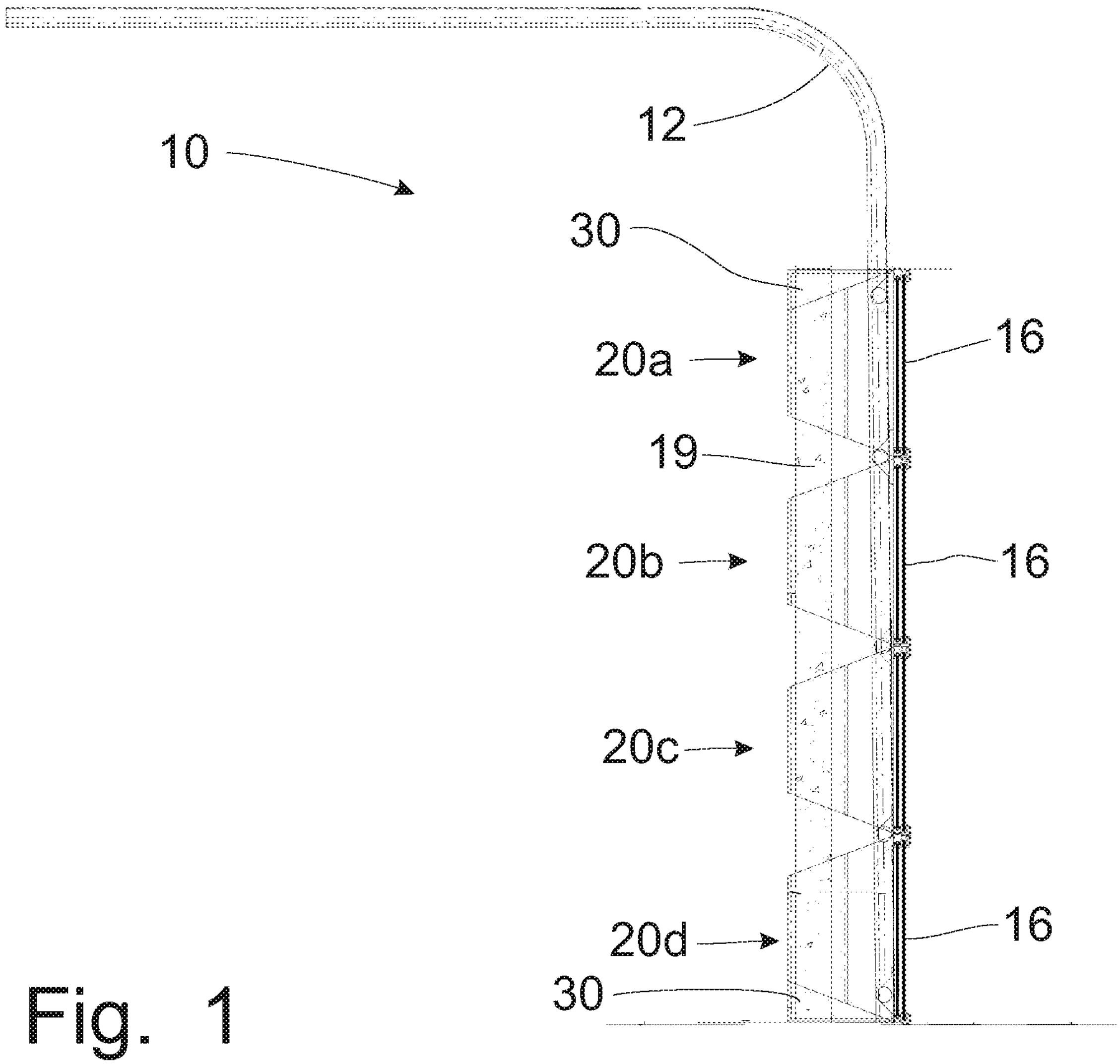
FIG. 1 is a schematic side elevational view of an impact resistant garage door configuration incorporating the principles of the instant invention and being show in the closed orientation.
Figure 2:
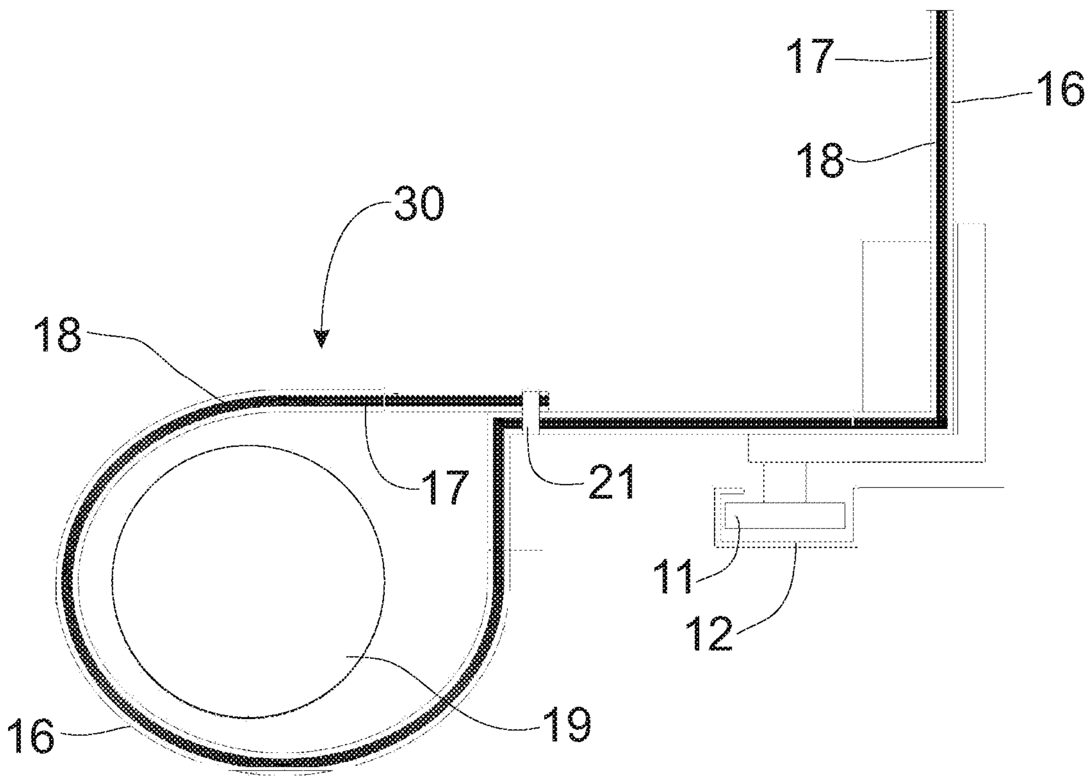
FIG. 2 is a schematic partial top plan view of the impact resistant garage door configuration showing the interengagement with a bollard incorporated into the floor of the garage behind and to the side of the garage door opening.
Figure 3:
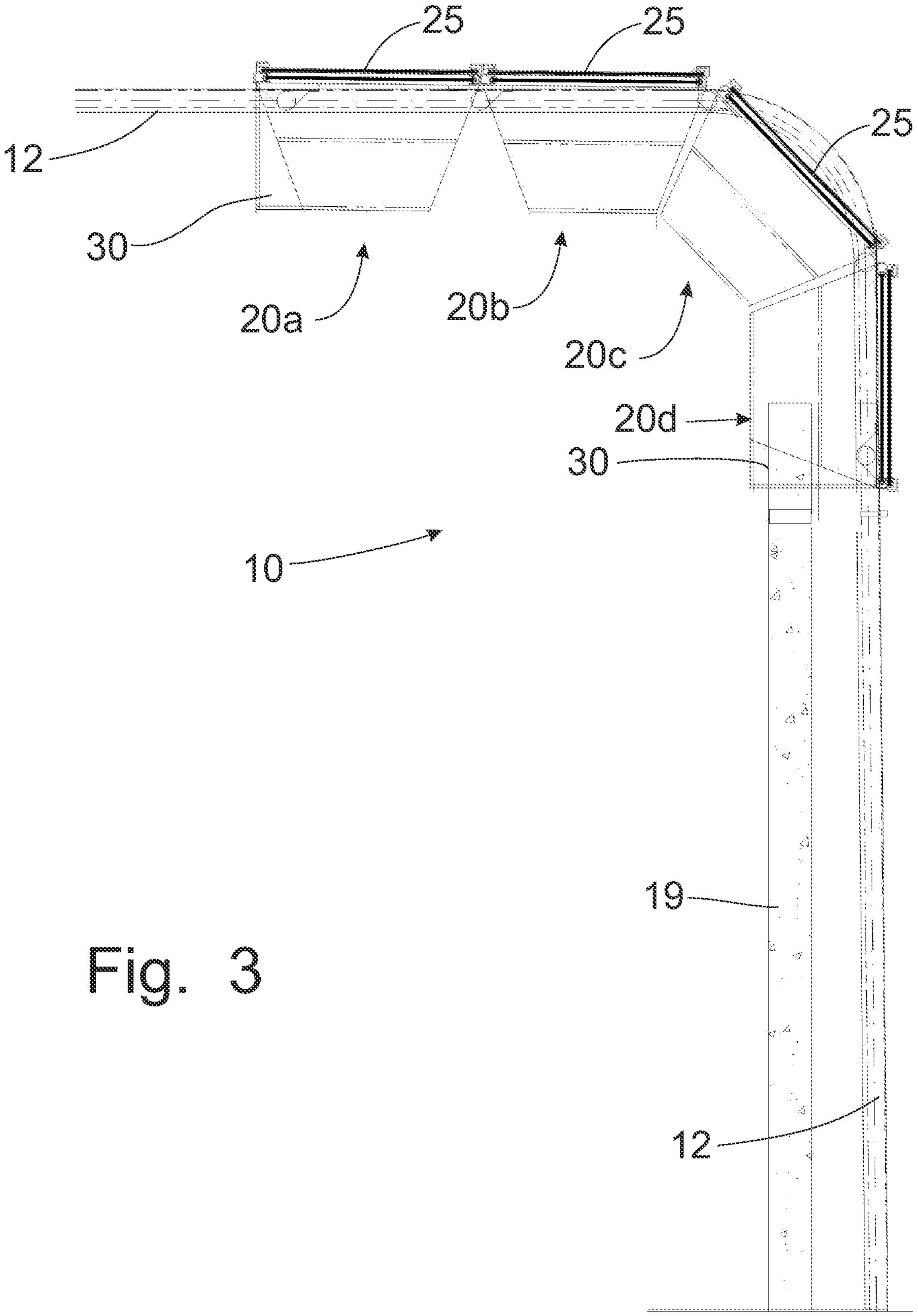
FIG. 3 is a schematic, enlarged side elevational view of the impact resistant garage door configuration in an elevated orientation.
Figure 4:
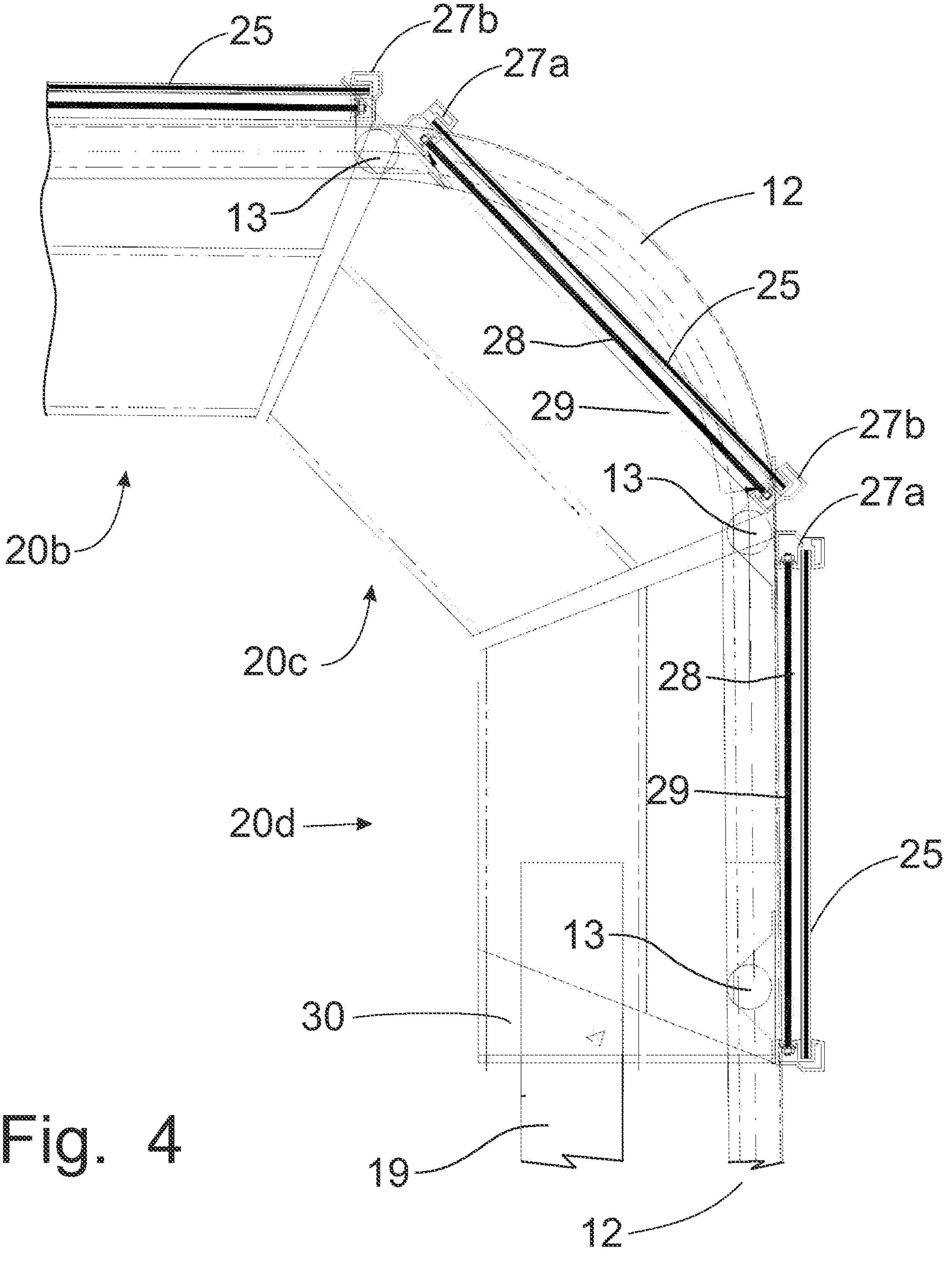
FIG. 4 is a schematic, enlarged view of a portion of the impact resistant garage door configuration as shown in FIG. 3.
Figure 5:
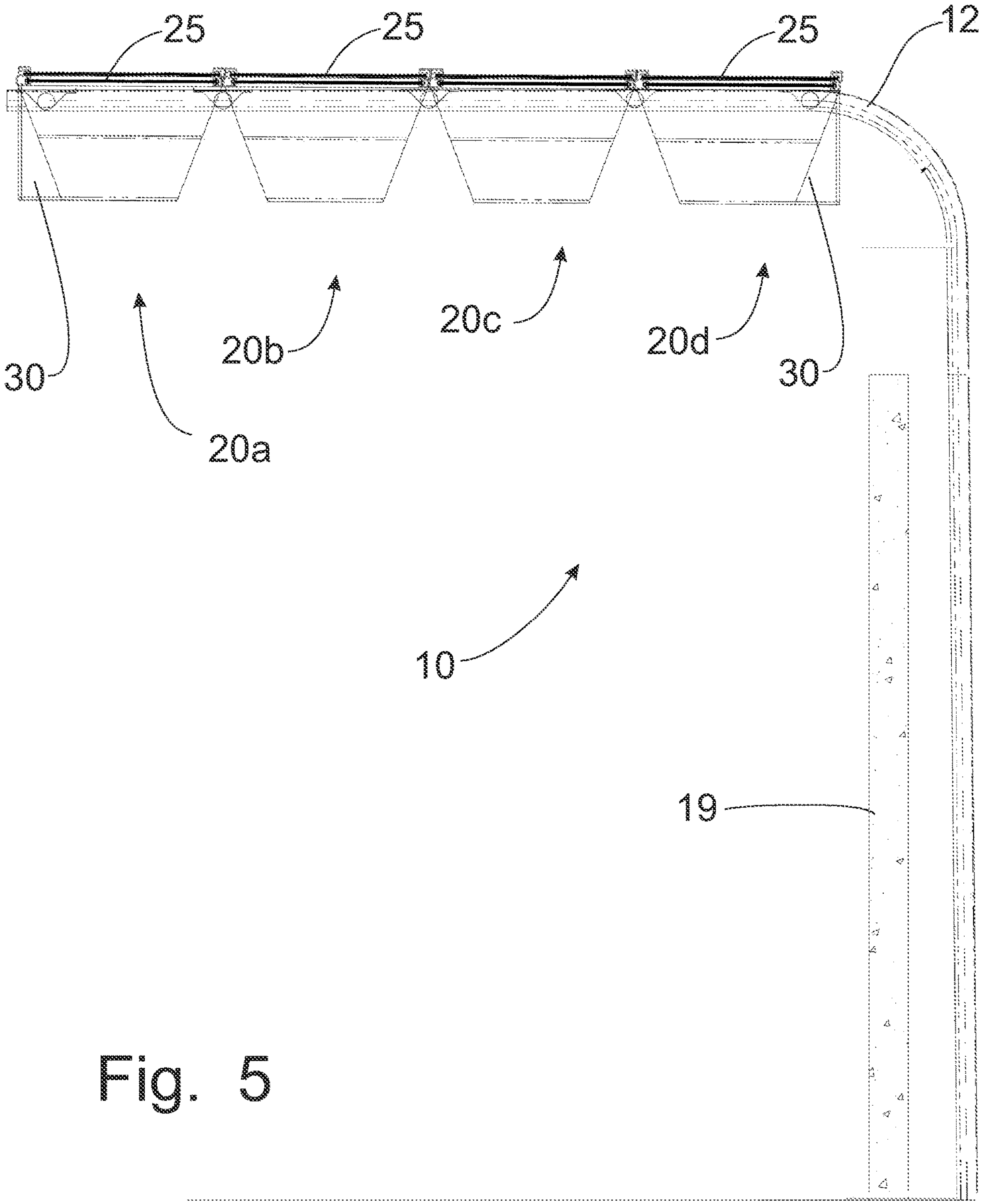
FIG. 5 is a schematic side elevational view of the impact resistant garage door configuration similar to that of FIG. 3 but elevated into a fully opened orientation.
Figure 6:
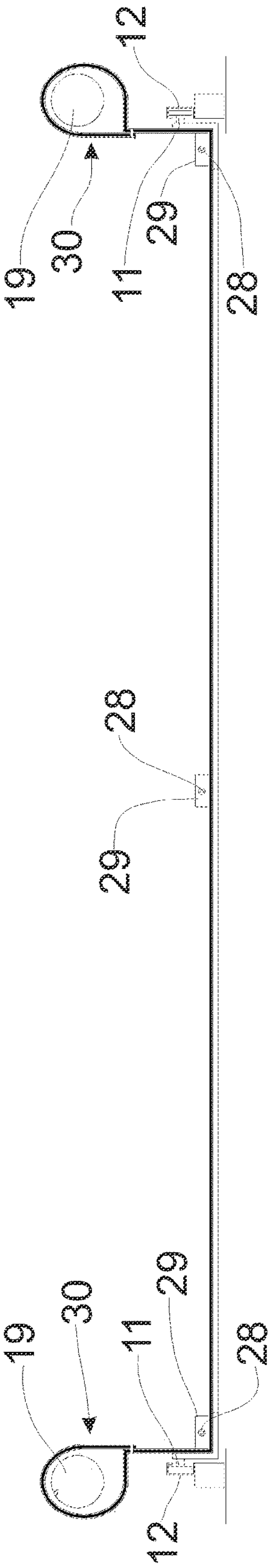
FIG. 6 is a schematic top plan view of the body portion of the impact resistant garage door incorporating the pair of bollards installed into the garage floor.
Figure 7:
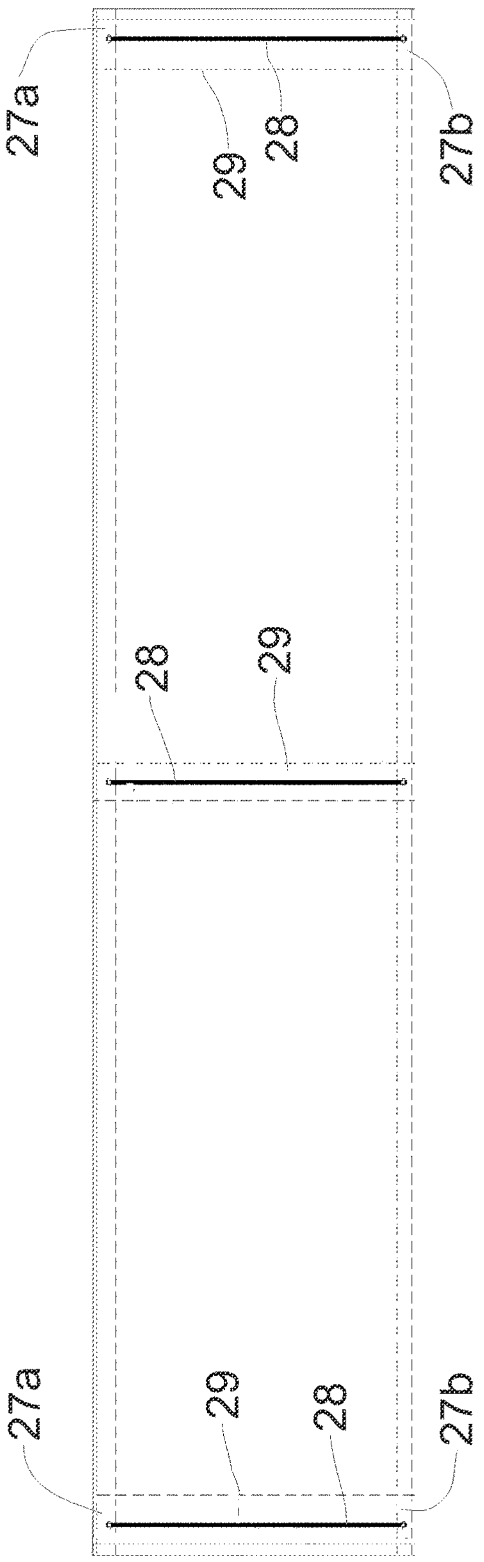
FIG. 7 is a schematic front elevational view of a representative panel incorporating the principles of the instant invention.

The impact resistant door 10 is formed from a plurality, preferably four, horizontally extending panels 20 that are guided in vertical movement in a conventional manner by guide rollers 11 moving along a pair of opposing grooved guide members 12 at each lateral end of the panels 20. Adjacent panels 20 are pivotally connected by a pivot member 13 that permits rotational movement of the adjacent panels 20 when the garage door 10 is being raised or lowered, as is represented in FIGS. 3 and 4. One skilled in the art will note that the top and bottom panels 20*a*, 20*d* are configured differently than the middle panels 20*b*, 20*c*, as will be described in greater detail below. Each panel 20, however, is formed with a panel body 15 that has a front impact shield 16 and a rear plate 17, preferably made from 6061 or 6063 aluminum, between which is sandwiched a layer of multiple plies of high strength ballistic material 18, thereby making this panel 20 bullet resistant.

As part of the garage door 10 configuration, a pair of laterally opposing bollards or stanchions 19 is positioned rearwardly of the grooved guide members 12 so as to not interfere with the basic function of the garage door 10. The top and bottom panels 20*a* and 20*d* are formed to integrate with the opposing bollards 19. As is depicted in the partial plan view of FIG. 2, the front impact plate 16 makes a right angle bend at the end of the panel 20 and extend rearwardly therefrom past a point where a connection bolt 21 will be installed. The front impact plate 16 then bends to the left through another right angle bend and then encircles the bollard 19 until becoming parallel with the rearwardly extending portion 30 of the front impact shield 16 and extending past the point for the connection bolt.

The rear plate 17 follows the same shape as the front impact shield 16, running parallel thereto. In between the runs of the front impact shield 16 and the rear plate 17, the multiple plies of ballistic material form a sandwiched layer 18. Ultimately, connection bolts (not shown) are inserted through a flow drilled hole extending through the overlapping layers of the extended panel body 15. One skilled in the art will recognize that at least the opposing ends of the top and bottom panels 20*a*, 20*d* and formed in the same configuration so that both of the bollards are integrated into the garage door 10 configuration. As the garage door 10 is raised or lowered, the rearwardly extending portions 30 of the panel body 15 slides vertically along the bollards 19, moving from the orientations respectfully shown in FIGS. 1, 3 and 5.

The middle panels 20*b*, 20*c* are preferably formed identically with the top and bottom panels 20*a*, 20*d*, but also may be formed differently from the top and bottom panels 20*a*, 20*d* in that the bodies 15 of the intermediate panels would not be extended around the bollards 19. In such a configuration, each panel body 15 would be simply received in a mounting structure described in greater detail below. The side elevation view of the rearwardly extending structure 25, as is seen in FIGS. 8 and 9, is shaped in a trapezoid. Thus, one configuration of the garage door 10 is that only the top and bottom panels 20*a*, 20*d* are in communication with the respective opposing bollards 19; however, the rearward structure 25 for each end of the top and bottom panels 20*a*, 20*d* does have a sloped side corresponding to the adjacent panel 20*b*, 20*c*, so that the garage door 10 can navigate the 90 degree curve at the top of the grooved guide 12. Alternatively, all panels 20 can be configured to include rearwardly extending portions 30 that encircle the bollards 19. Such a configuration would enhance crash resistance of the garage door 10 by engaging the central panels 20 to the bollards.

Figure 10:
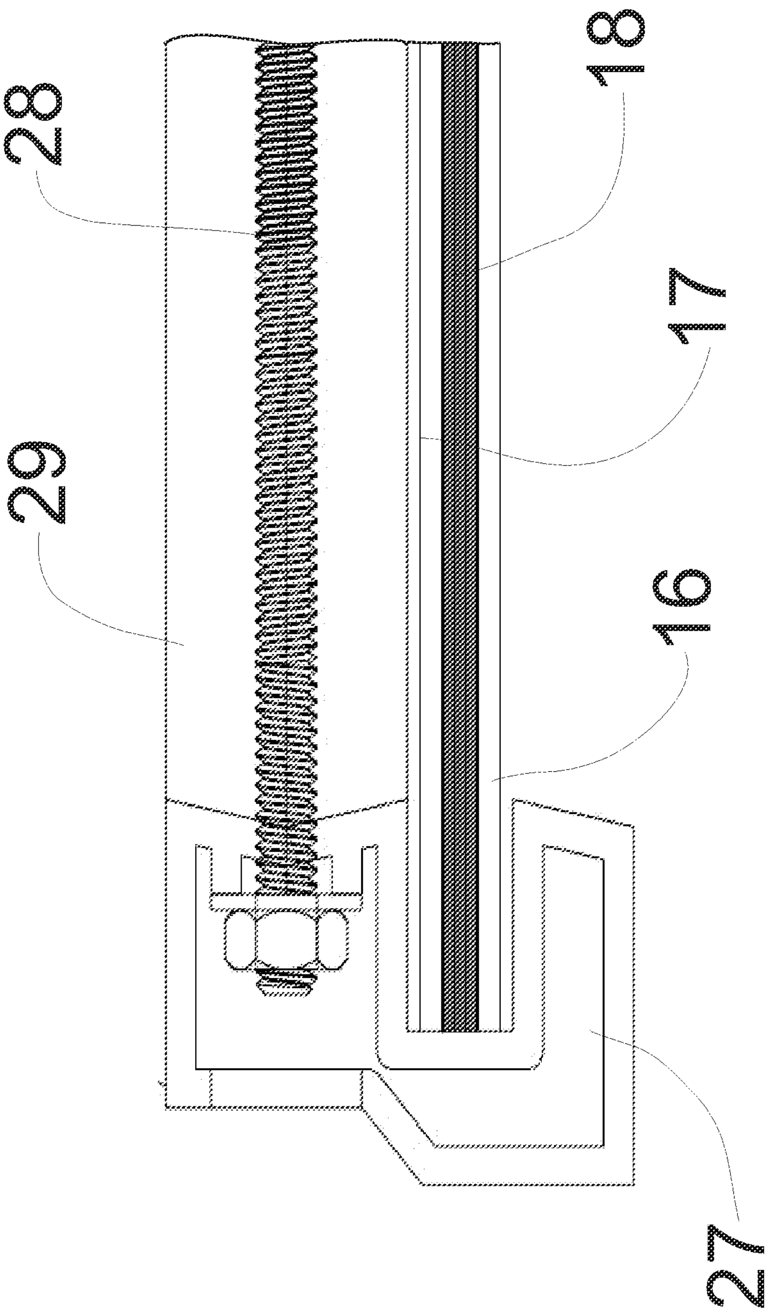
FIG. 10 is a schematic, enlarged partial cross-sectional view of the extrusion holding the panel body in the impact resistant garage door configuration.

Each panel 20 includes an upper and lower cap member 27*a*, 27*b*, which can be formed as an extrusion from aluminum, preferably 6061 or 6063 grade, or cast from an appropriate metal. The cap members 27*a*, 27*b*, the Level 3 of which is depicted in cross-section in FIG. 10, extend along the entire length of the panels 20 and are interconnected by threaded members 28 at the opposing ends of the cap members 27*a*, 27*b*, and at the mid-point of the panels 20. The rearward structures of the panels 20 are affixed to the rear plate 17 and to the upper and lower cap members 27*a*, 27*b*. As is depicted in FIG. 4, the upper and lower cap members 27*a*, 27*b* of adjacent panels 20 are connected to the pivot 13 to permit rotational movement of one panel 20 relative to the adjacent panel 20. Preferably, the back side of the panels 20 includes aluminum tubes 29, at each lateral end of the panel 20 and in the middle of the panel 20, within which the treaded members 28 reside. The presence of the tubes 29 provides additional stiffness to the panel structure, particularly in the central portion thereof.

One of ordinary skill in the art will note that formation of the rearwardly extending portions 30 of the half-inch thick front impact shield 16 to bend twice and then encircle the bollard 19 would be significantly more difficult than bending aluminum that is 0.09 inches thick. Thus, for the Level 8 impact resistant garage doors, a plate of 0.09 inch 6061 aluminum is secured to the lateral ends of the front impact shield 16, such as by welding, and that plate of aluminum is bent as described above to ultimately encircle the corresponding bollard 19. Cap members (not shown) can also be placed along the lateral side portions of the respective panels 20. With vertical side cap members, along with the horizontal top and bottom cap members 27*a*, 27*b*, the panel bodies 15 will the captured like a picture frame. This frame is held together with treaded members 28, with L-hooks (not shown) within the extrusions, and with high strength glue within the frame.

Figure 12:
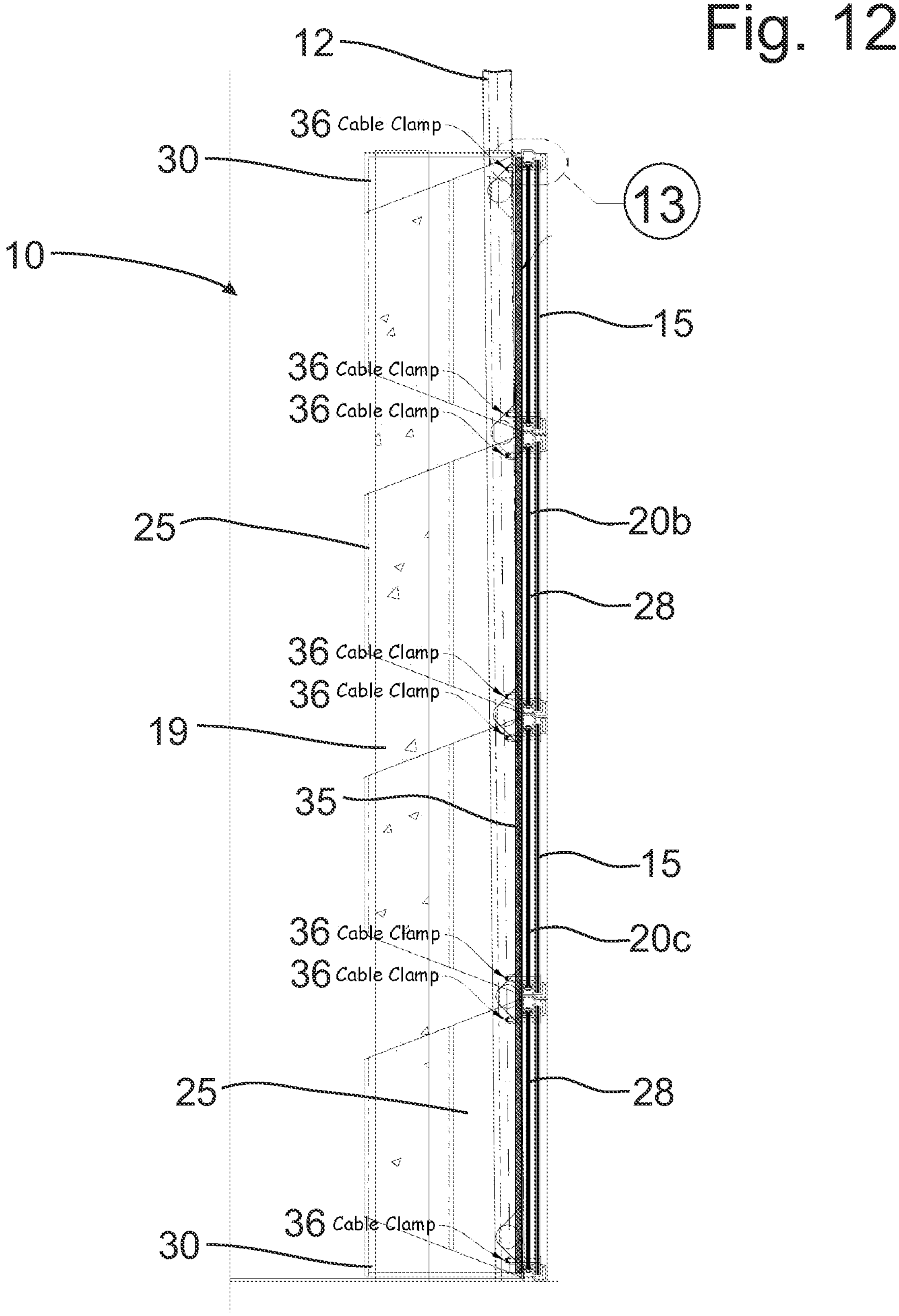
FIG. 12 is a side elevational view of the garage door shown in FIG. 11.

Referring now to FIGS. 11-13, an optional component, which can be added to change the configuration of the crash resistant and bullet resistant garage door 10, can best be seen. The garage door 10 is constructed as described above with a bullet resistant panel body 15, rearward structures 25, and rearwardly extending portions 30 of the panel body 15 that interface with bollards 19 to create a crash resistant and bullet resistant garage door 10. In addition to this aforementioned structure, this alternative structure incorporates a steel cable 35, such as a one-half inch diameter steel cable, that is clamped to the central upper and lower portions of each panel 20 by cable clamps 36. The provision of the steel cable 35 in addition to the aforementioned crash resistant structure reinforces the center of the garage door panels 20 to further resist the passage of a vehicle crashing into the garage door 10.

The steel cable 35 is located rearwardly of the central aluminum tube 29 that houses the threaded member 28. Each cable clamp 36 includes a conventional arcuate member 38 formed to fit on the cable 35 and then clamped against the cable 35 by threaded clamp bolts 37 that pass through the aluminum tube 29 on opposing sides of the cable 35 and into engagement with the arcuate member 38. Tightening the nuts of the clamp bolts 37 until the cable 35 is securely pressed against the aluminum tube 29 fixes the cable 35 against vertical movement as the garage door panels 20 move vertically and does not hinder the raising and lowering of the garage door 10 along the guide member 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For example, 6061 aluminum material can be substituted for the preferred 6063 aluminum material used in the interior and exterior aluminum panels 21-24; however, material thicknesses may require adjustment to maintain the desired bullet resistance capability.

In the way of an example, the rearward structure described above, could also be formed with high strength ballistic material wrapped about a metal form. Also, the high strength ballistic material could be sandwiched between metal members, such as aluminum.

Having thus described the invention, what is claimed is:

1. An impact resistant garage door having a plurality of horizontally extending panels, including a top panel, a bottom panel and multiple middle panels, interconnected by a pivot located between adjacent ones of the panels to permit rotation of the adjacent panels relative to each other, comprising:

a vertical bollard supported rearwardly on opposing sides of the garage door;

each said panel having a panel body formed with a layer of high strength ballistic material sandwiched between a front impact shield and a rear plate;

the top and bottom panels also having opposing rearward extensions of the panel body, which encircles the respective bollards, said rearward extensions sliding vertically along the bollards when the garage door moves between raised and lowered orientations.

2. The impact resistant garage door of claim 1 wherein said panel body includes:

said front impact shield being formed from a metallic material;

said rear plate also being formed from said metallic material; and said layer of high strength ballistic material being formed from multiple plies of sheets of said high strength ballistic material.

3. The impact resistant garage door of claim 2 wherein said metallic material is aluminum.

4. The impact resistant garage door of claim 2 wherein each said bollard has a vertical height at least as great as the height of said garage door so that said top panel has the corresponding rearward extensions encompassing the respective bollards when said impact resistant garage door is placed into a lowered, closed orientation.

5. The impact resistant garage door of claim 2 wherein each of the panels further comprises:

a top cap member and a bottom cap member extending horizontally along said panel, each of the cap members having a receptacle therein for receiving engagement with said panel body.

6. The impact resistant garage door of claim 5 wherein said top and bottom cap members on each said panel are interconnected by a threaded member at each lateral end of each said panel, and at a central location between said lateral ends.

7. The impact resistant garage door of claim 6 wherein each said treaded member is received within a vertical tube extending between said top and bottom cap members.

8. The impact resistant garage door of claim 5 wherein each said panel further comprises:

said rearward extensions extending from laterally opposed ends of each said panel and projecting rearwardly from said panel body, each said rearward extension including one or more sloped surfaces to permit the rotation of two of the adjacent panels when said impact resistant ga door is being moved vertically.

9. The impact resistant garage door of claim 1 wherein a cable is provided to extend from a central portion of an upper edge of the top panel to a central portion of a lower edge of the bottom panel to reinforce the central portion of said garage door and enhance impact resistance thereof.

10. The impact resistant garage door of claim 9 wherein said cable is secured to upper and lower portions of each of the panels.

11. The impact resistant garage door of claim 1 wherein each of the panels have opposing rearward extensions of the panel body that encircles the respective bollards and slide vertically along the bollards when the garage door moves between raised and lowered orientations.

12. An impact resistant garage door having a plurality of horizontally extending panels, including a top panel, a bottom panel and multiple intermediate panels, interconnected by a pivot located between adjacent ones of the panels to permit rotation of adjacent ones of the panels relative to each other when the garage door moves between a vertically oriented lowered orientation and a horizontally oriented raised orientation, comprising:

a vertical bollard supported rearwardly on opposing sides of the garage door;

each said panel having a panel body structure formed of a layer of high strength ballistic material sandwiched between a front impact shield and a rear plate;

each said panel having top and bottom cap members positioned to receive and capture said panel body structure;

the top and bottom panels also having opposing rearward extensions of the panel body, which encircles the respective bollards, said rearward extensions moving vertically along the bollards when the garage door moves between the raised and lowered orientations.

13. The impact resistant garage door of claim 12 wherein said top and bottom cap members on each said panel are interconnected by a threaded member at opposing lateral ends of each said panel, and at a central location b tween said lateral ends.

14. The impact resistant garage door of claim 13 wherein each said treaded member is received within a vertical tube extending between said top and bottom cap members.

15. The impact resistant garage door of claim 12 wherein said panel body includes:

said front impact shield being formed from aluminum;

said rear plate also being formed from aluminum; and said layer of high strength ballistic material being formed from multiple plies of sheet of said high strength ballistic material.

16. The impact resistant garage door of claim 15 wherein each said bollard has a vertical height at least as great as the height of said garage door so that said top panel has the corresponding rearward extensions encompassing the respective bollards when said impact resistant garage door is placed into a lowered, closed orientation.

17. An impact resistant garage door having a plurality of horizontally extending panels, including a top panel, a bottom panel and multiple middle panels, interconnected by a pivot located between adjacent ones of the panels to permit rotation of the adjacent panela relative to each other, comprising:

a vertical bollard supported rearwardly on opposing sides of the garage door;

each said panel having a panel body formed with a layer of high strength ballistic material sandwiched between an aluminum front impact shield and an aluminum rear plate;

each said panel having top and bottom cap members positioned to receive and capture said panel body;

said top and bottom panels also having opposing rearward extensions of the panel body, which encircles the respective bollards, said rearward extensions sliding vertically along the bollards when the garage door moves between raised and lowered orientations.

18. The impact resistant garage door of claim 17 wherein each said bollard has a vertical height at least as great as the height of said garage door so that said top panel has the corresponding rearward extensions encompassing the respective bollards when said impact resistant garage door is placed into a lowered, closed orientation.

19. The impact resistant garage door of claim 17 wherein said top and bottom cap members on each said panel are interconnected by a threaded member at each lateral end of each said panel, and at a central location between said lateral ends.

* * * * *